United States Patent
Sabeur et al.

(10) Patent No.: US 11,595,872 B1
(45) Date of Patent: Feb. 28, 2023

(54) SELECTION OF RATS FOR HANDOVERS FROM 4G

(71) Applicant: T-Mobile USA, Inc., Bellevue, WA (US)

(72) Inventors: Nassereddine Sabeur, Seattle, WA (US); Joel Arends, Renton, WA (US); Raymond Thomas Ball, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 17/243,094

(22) Filed: Apr. 28, 2021

(51) Int. Cl.
*H04W 4/00* (2018.01)
*H04W 36/14* (2009.01)
*H04W 36/30* (2009.01)
*H04W 36/00* (2009.01)

(52) U.S. Cl.
CPC ....... *H04W 36/14* (2013.01); *H04W 36/0085* (2018.08); *H04W 36/30* (2013.01)

(58) Field of Classification Search
CPC .. H04W 36/14; H04W 36/0085; H04W 36/30
USPC ........................................................ 370/331
See application file for complete search history.

(56) References Cited

U.S. PATENT DOCUMENTS

| | | | |
|---|---|---|---|
| 9,998,983 B2* | 6/2018 | Cui ....................... | H04W 48/18 |
| 10,911,994 B2* | 2/2021 | Chauhan ............... | H04W 48/16 |
| 10,966,126 B2* | 3/2021 | Kim ....................... | H04W 28/08 |
| 11,026,129 B2* | 6/2021 | Zhu .................... | H04W 36/0022 |
| 11,102,683 B2* | 8/2021 | Sillanpaa .......... | H04W 36/0072 |
| 11,159,933 B2* | 10/2021 | Zong ...................... | H04W 36/14 |
| 11,229,085 B2* | 1/2022 | Suh ........................ | H04W 88/02 |
| 11,234,115 B2* | 1/2022 | Watanabe ............. | H04W 36/14 |
| 11,240,775 B2* | 2/2022 | Liu .................... | H04W 36/0079 |
| 11,259,217 B2* | 2/2022 | Lee ................... | H04W 36/0016 |
| 11,356,818 B2* | 6/2022 | Lee ....................... | H04W 48/10 |
| 11,375,564 B2* | 6/2022 | Marupaduga ......... | H04W 76/15 |
| 11,432,218 B2* | 8/2022 | Chen ................... | H04L 61/4511 |
| 11,452,020 B2* | 9/2022 | Dodd-Noble ..... | H04W 36/0033 |
| 11,470,515 B2* | 10/2022 | Shekhar ................ | H04W 48/16 |
| 2009/0201878 A1* | 8/2009 | Kotecha ............ | H04W 36/0033 370/331 |
| 2012/0215890 A1* | 8/2012 | Doyle ..................... | H04L 67/60 709/219 |
| 2015/0296422 A1* | 10/2015 | Melin ............... | H04W 36/0022 370/331 |
| 2016/0183233 A1* | 6/2016 | Park .................. | H04W 36/0072 370/329 |
| 2016/0277992 A1* | 9/2016 | Cao .................... | H04W 28/0808 |
| 2016/0381609 A1* | 12/2016 | Alriksson ......... | H04W 36/0094 370/331 |
| 2018/0160290 A1* | 6/2018 | Bouvet ................. | H04W 8/082 |
| 2018/0184336 A1* | 6/2018 | Keller ................... | H04W 36/08 |

(Continued)

*Primary Examiner* — Amancio Gonzalez
(74) *Attorney, Agent, or Firm* — Lee & Hayes, P.C.

(57) ABSTRACT

As described herein, one of a third generation (3G) radio access network (RAN) or a fifth generation (5G) RAN may be selected to receive a handover of a communication session from a fourth generation (4G) RAN. The 3G RAN or 5G RAN may be selected based on at least one of performance measurements for the 3G RAN and the 5G RAN, a preference for the 3G RAN or the 5G RAN, or a performance threshold for the 3G RAN or for the 5G RAN. The handover to the selected one of the 3G RAN or 5G RAN may then be initiated.

20 Claims, 4 Drawing Sheets

(56) References Cited

U.S. PATENT DOCUMENTS

| | | | |
|---|---|---|---|
| 2019/0281647 A1* | 9/2019 | Chiang | H04L 65/1069 |
| 2019/0394245 A1* | 12/2019 | Niemi | H04L 65/1016 |
| 2019/0394688 A1* | 12/2019 | Zhu | H04W 36/0022 |
| 2020/0305033 A1* | 9/2020 | Keller | H04L 65/1016 |
| 2020/0305211 A1* | 9/2020 | Foti | H04M 15/57 |
| 2020/0322850 A1* | 10/2020 | Zhu | H04W 76/25 |
| 2021/0045018 A1* | 2/2021 | Xu | H04W 36/0022 |
| 2021/0158620 A1* | 5/2021 | Saraf | H04W 48/08 |
| 2021/0267000 A1* | 8/2021 | Jain | H04W 72/10 |
| 2021/0352552 A1* | 11/2021 | Keller | H04W 76/34 |

\* cited by examiner

SELECTION OF RATS FOR HANDOVERS FROM 4G

BACKGROUND

Cellular communication devices, often referred to as mobile devices or user equipment (UE), use network radio access technologies (RATs) to communicate wirelessly with geographically distributed cellular base stations. Long-Term Evolution (LTE) is an example of a widely implemented radio access technology that is used in Fourth Generation (4G) communication systems. New Radio (NR) is a newer radio access technology that is used in Fifth Generation (5G) communication systems. Legacy RATs include those of Third Generation (3G) and Second Generation (2G) communication systems. Standards for LTE and NR radio access technologies, as well as RATs for 3G systems, have been developed by the 3rd Generation Partnership Project (3GPP) for use by wireless communication carriers.

5G systems thus far have assumed a Non-Standalone (NSA) implementation, with a 5G radio access network (RAN) paired with a 4G RAN. The 4G RAN carries the voice and signaling, and the 5G RAN carries data. If a handover is need from the 5G leg of the NSA implementation, the 4G RAN receives the data session from the 5G RAN. If a handover is needed from a 4G RAN, whether alone or paired with a 5G RAN in a NSA implementation, the handover is to a 3G RAN.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques for selecting one of a 3G RAN or a 5G RAN to receive a handover of a communication session from a 4G RAN. A telecommunication node configured to perform the techniques may determine that a handover should occur based, e.g., on measurement reports received from a UE that is party to the communication session. The telecommunication node may select the 3G RAN or 5G RAN based on at least one of performance measurements for the 3G RAN and the 5G RAN, a preference for the 3G RAN or the 5G RAN, or a performance threshold for the 3G RAN or for the 5G RAN. Then, the telecommunication node may initiate the handover to the selected one of the 3G RAN or 5G RAN. In some examples, the telecommunication node may be a mobility management entity (MME) of a telecommunication network.

In some implementations, selecting one of the 3G RAN or the 5G RAN may be based multiple ones of performance measurements, preferences, and performance thresholds. For example, the telecommunication device may determine that a first one of the 3G RAN or the 5G RAN ("first RAN") is associated with better performance measurements than the other one of the 3G RAN or the 5G RAN ("second RAN"). If there is preference for the one of the 3G RAN or the 5G RAN determined to be the first RAN, then the telecommunication node selects the first RAN for the handover. If there is a preference for whichever of the 3G RAN or 5G RAN is determined to have the poorer performance measurements (i.e., the second RAN), then the telecommunication node determines whether the performance of the second RAN exceeds a performance threshold. If the performance exceeds a performance threshold, the telecommunication node selects the second RAN for the handover. However, if the performance of the second RAN does not exceed the performance threshold, then the telecommunication node selects the first RAN for the handover.

In further implementations, the telecommunication node may utilize a single factor, such as performance measurements or preference, to select between the 3G RAN or the 5G RAN. For example, the telecommunication node may select whichever of the 3G RAN or the 5G RAN has the better performance measurements or whichever of the 3G RAN or the 5G RAN is the object of a preference (e.g., a user preference or a preference determined by the telecommunication network).

Figure 1:
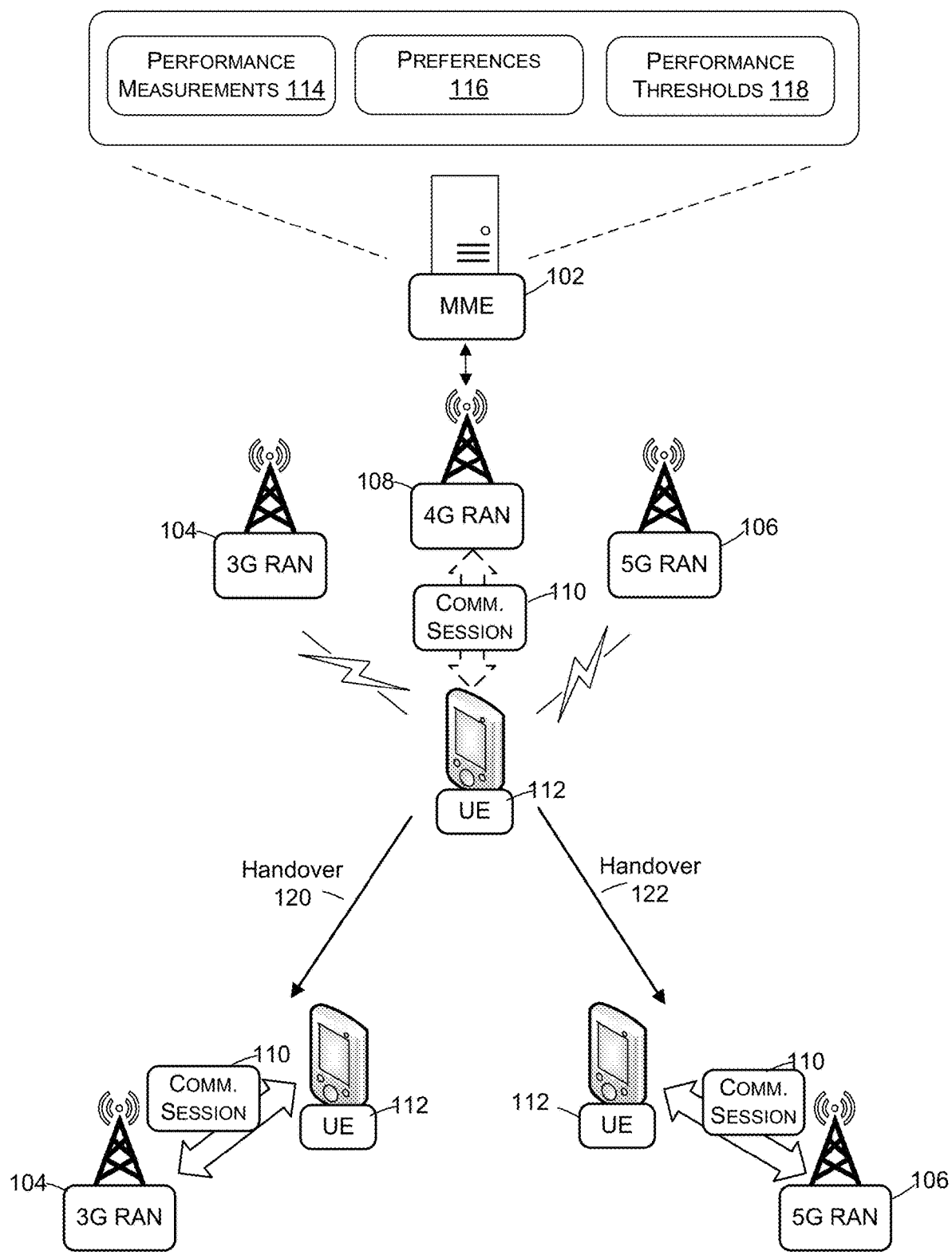
FIG. 1 depicts devices, connections, and operations involved in the selection of a 3G RAN or 5G RAN to receive a handover of a communication session from a 4G RAN.

FIG. 1 depicts devices, connections, and operations involved in the selection of a 3G RAN or 5G RAN to receive a handover of a communication session from a 4G RAN. As illustrated, an MME 102 may select one of a 3G network 104 or a 5G network 106 to receive a handover from a 4G RAN 108 of a communication session 110 for a UE 112. The MME 102 may consider performance measurements 114, preferences 116, or performance thresholds 118 in selecting between the 3G RAN 104 or 5G RAN 106. Based on the selection, the MME 102 initiates either a handover, at 120, to the 3G RAN 104 or a handover, at 122, to the 5G RAN 106.

In various implementations, the MME 102 is connected to the 4G RAN 108 and a 4G core network (not shown). While illustrated and described with respect to FIG. 1 as an MME, MME 102 may be another telecommunication node or telecommunication nodes of the telecommunication network. The MME 102 may be a control node for the 4G RAN 108, involved in paging, retransmissions, bearer activation/deactivation, selection for a UE of a serving gateway (SGW) in the 4G core network, authentication with a home subscriber server of the 4G core network, intra-4G handovers, and interfacing with nodes of other core networks, such as a 3G core network or a 5G core network. In addition to these functionalities, the MME 102 may be configured to perform the operations shown in FIGS. 3 and 4 and to include modules such as those shown in FIG. 2.

The 4G RAN 108—connected to the MME 102 and UE 112—may support a connection carrying a communication session 110 and may have, in its geographic vicinity, the 3G RAN 104 and 5G RAN 106. Each of the 4G RAN 108, 3G RAN 104, and 5G RAN 106 may be in range of the UE 112 and capable (in at least some circumstances) of supporting a connection with the UE 112. The 4G RAN 108 may support any type of 4G RAT, such as LTE. The 5G RAN 106 may support any type of 5G RAT, including at least NR. And the 3G RAN 104 may support any type of 3G RAT, such as the Universal Mobile Telecommunications System (UMTS). Each of the RANs 104-108 may include a base station with one or more radio antennas located at a cell site. In some examples, the base stations of multiple ones of the RANs 104-108 may be co-located at a same cell site. The base station of the 3G RAN 104 may be referred to as a "Node B", the base station of the 5G RAN may be referred to as a "gNode B", and the base station of the 4G RAN 108 may be referred to as an "eNode B".

In various embodiments, the communication session 110 may represent communication of any sort of data, whether latency-sensitive—such as voice or video calling, video streaming, gaming, etc.—or other data—e.g., text or multimedia messaging, data browsing, etc. In some implementations, different measurements may be used for different types of data, and different handover criteria may be applied. Also, in some implementations, the preferences 116 of a user for one of the 3G RAN 104 or 5G RAN 106 may be specific to different data types, with, e.g., speed (and the 5G RAN 106) preferred for video streaming and reliability (and the 3G RAN 104) prioritized for voice calling.

The UE 112 engaged in the communication session 110 may be any of various types of wireless cellular communication devices that are capable of wireless data and/or voice communications, including smartphones and other mobile devices, "Internet-of-Things" (IoT) devices, smart home devices, computers, wearable devices, entertainment devices, industrial control equipment, etc. In the described implementations, the UE 112 supports 3G, 4G, and 5G networks and communications. Accordingly, the UE 112 has one or more radios that communicate wirelessly with the base stations of the 3G RAN 104, the 4G RAN 108, and the 5G RAN 106. The UE may be configured to scan for and identify the base stations of the RANs 104-108, to connect to one(s) of those base stations, to initiate and engage in the communication session 110, and to capture performance measurements and provide those measurements in one or more measurement reports to one or more of the RANs 104-108.

As shown in FIG. 1, the MME 102 may utilize any or all of performance measurements 114, preferences 116, or performance thresholds 118. These may be stored on or retrieved by the MME 102. The performance measurements 114 may be received at least from UE measurement reports. Those performance measurements 114 may relate to signal strength, packet loss, latency, etc.

The preferences 116 may be received from the UE 112 (either specified by the user or determined by the UE 112), determined by the MME 102, or received from the telecommunication network. Examples of preferences 116 determined by a device or network include preferences determined based on a UE type, a subscriber plan, a Quality-of-Service goal, a Quality-of-User-Experience goal, or a communication type associated with the communication session 110. In some examples, a user may specify a desired quality (e.g., speed, reliability, etc.), either for all communications, for specific communication types, or for specific communication partners, and the UE 112, MME 102, or network device may determine preferences 116 for the 3G RAN 104 or for the 5G RAN 106 based on the user-specified qualities/preferences.

The performance thresholds 118 may be the same across multiple connections or UEs or may be configurable based on a UE type, a subscriber plan, a Quality-of-Service goal, a Quality-of-User-Experience goal, a communication type associated with the communication session, a load for the 3G RAN, the 4G RAN, or the 5G RAN, a load for the core network, performance measurements of a communication partner UE, or performance measurements of a communication partner network. Such performance thresholds 118 may be updated by one or more network elements, such as an operations support system.

In various implementations, as described herein, the UE 112 may engage in the communication session 110 over a connection with the 4G RAN 108 and may provide measurement reports of network performance that include measures of signal strength, packet loss, latency, etc. These reports may be provided to the MME 102 by the base station of the 4G RAN 108 and monitored for conditions indicating that a handover should occur. If the performance measurements in the reports indicate that a handover is appropriate, the MME 102 may select a RAN to receive the handover and initiate the handover. If at any point prior to completion of the handover the performance measurements indicate that a handover is no longer appropriate, the MME 102 may terminate the handover and the communication session 110 may remain with the 4G RAN 108.

In some implementations, the measurement reports from the UE 112 may also include measurements for the 3G RAN 104 or the 5G RAN 106 of, e.g., signal strength, packet loss, latency, etc. These measurements for the 3G RAN 104 or the 5G RAN 106 may comprise at least a part of the performance measurements 114.

Upon determining that the communication session 110 should be handed over from the 4G RAN 108, the MME 102 selects one of the 3G RAN 104 and the 5G RAN 106 to receive the handover. As noted multiple times herein, that selection may involve one of the performance measurements 114, the preferences 116, or the performance thresholds 118, or may involve multiple ones of those criteria 114-118, evaluated in some sequence or formula.

An example of considering a single criterion is the use of performance measurements 114. These measurements 114 indicate the performance of the 3G RAN 104 and 5G RAN 106 with respect to one or more of signal strength, packet loss, latency, etc., and all or a subset of these may be compared, depending on configuration. The MME 102 then selects the one of the 3G RAN 104 or the 5G RAN 106 with the better performance measurements 114 to receive the handover.

Another example of considering a single criterion is the use of preferences 116. The MME 102 selects one of the 3G RAN 104 or the 5G RAN 106 in accordance with the preferences 116 to receive the handover.

In an example involving both performance measurements 114 and preferences 116, the preferences 116 may determine a subset of performance measurements 114 to compare. Rather than a preference 116 such as "reliability" being statically mapped to one of the RANs, e.g., 3G RAN 104, it could be mapped to a single measurement (e.g., packet loss) or multiple measurements. The MME 102 would determine the measurements 114 to compare based on the preferences 116, compare those measurements 114, and select the better performing one of the 3G RAN 104 or the 5G RAN 106 to receive the handover.

Figure 4:
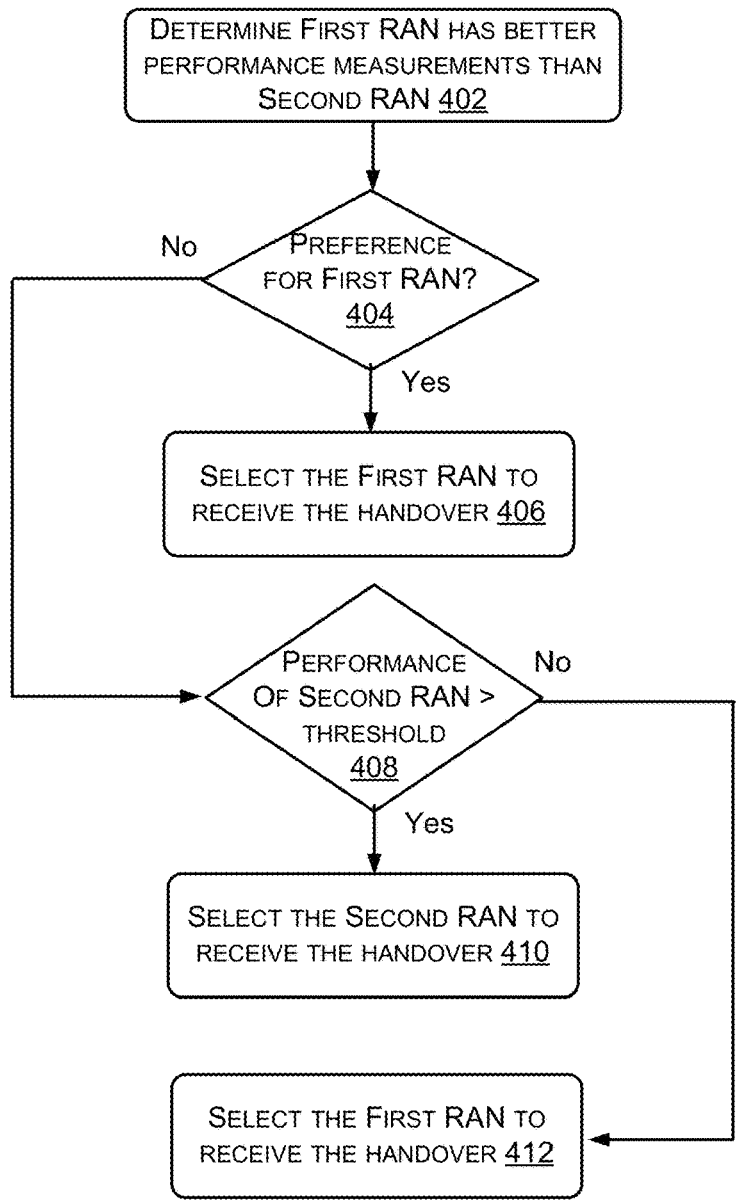
FIG. 4 is a flow diagram illustrating an example method for selecting one of a 3G RAN or a 5G RAN to receive a handover from a 4G RAN based on performance of the 3G RAN and 5G RAN, based on preferences, and based on performance thresholds.

In some implementations, such as that illustrated in FIG. 4 and described further herein, two or all three of criteria 114-118 may be utilized in selecting the RAN 104 or 106 to receive the handover. In such implementations, the MME 102 may determine if there is a preference 116 for the one of the 3G RAN 104 or the 5G RAN 106 associated with better performance measurements 114 (the "first RAN" for purposes of discussion). If there is a preference 116 for the first RAN, the MME 102 selects the first RAN.

If, on the other hand, there is a preference 116 for the other of the 3G RAN 104 or the 5G RAN 106 (i.e., the RAN with the poorer performance measurements 114—the "second RAN" for purposes of discussion), then the MME 102 determines whether performance of the second RAN exceeds a performance threshold 118. If the performance exceeds the performance threshold 118, the MME 102 selects the second RAN to receive the handover. However, if the performance does not exceed the performance threshold 118, then the MME 102 selects the first RAN to receive the handover.

In various implementations, the MME 102 then initiates the handover to the selected one of the 3G RAN 104 or the 5G RAN 106. At 120, when the 3G RAN 104 is selected, the MME 102 initiates the handover to the 3G RAN 104. At 122, when the 5G RAN 106 is selected, the MME 102 initiates the handover to the 5G RAN 106. Handovers in both cases may then proceed in accordance with standards, such as 3GPP standards.

Figure 2:
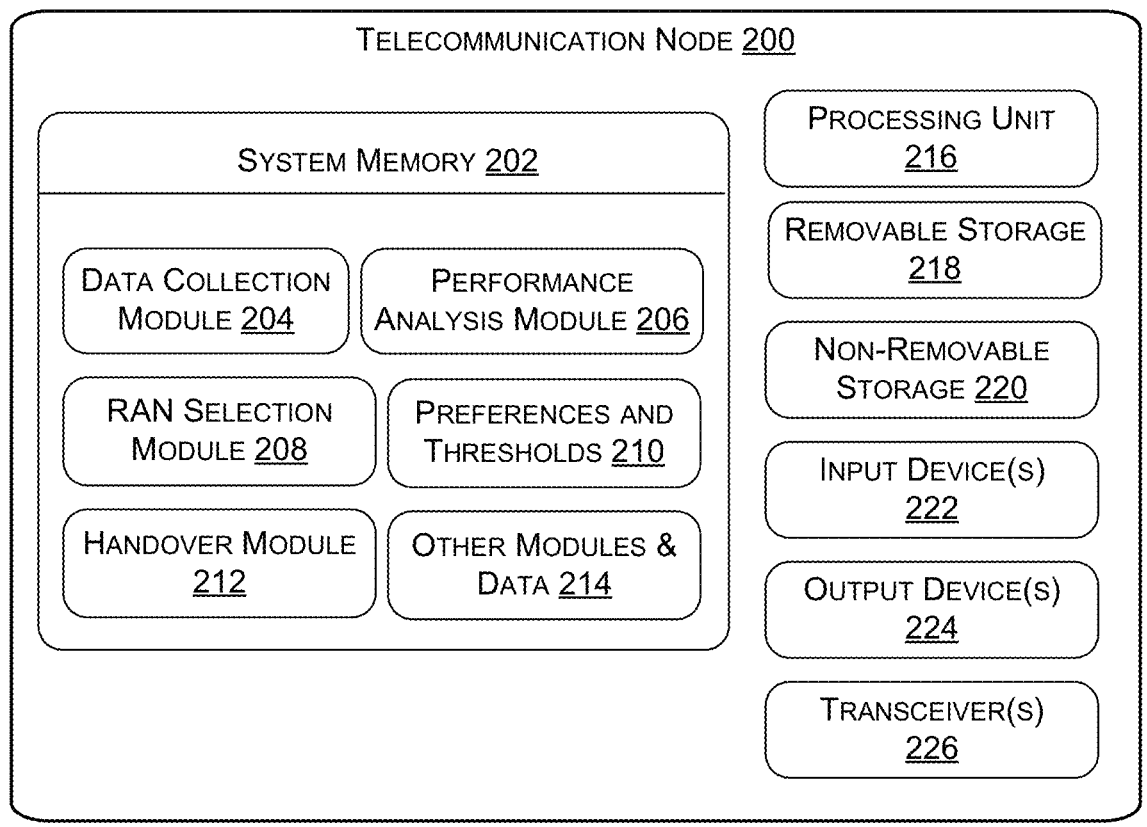
FIG. 2 is a block diagram of an example telecommunication node configured to implement various functionalities described herein.

FIG. 2 is a block diagram of an example telecommunication node 200 that may be used to implement various functionalities described herein. The telecommunication node 200 may be used to implement the MME 102, for example.

In various examples, system memory 202 can be volatile (such as RAM), non-volatile (such as ROM, flash memory, etc.), or some combination of the two. Example system memory 202 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The system memory 202 may include a data collection module 204, performance analysis module 206, a RAN selection module 208, preferences and threshold 210, a handover module 212, and other modules and data 214. The data collection module 204 may receive measurement reports from UEs, such as UE 112, performance measurements, such as performance measurements 114, preferences, such as preferences 116, performance thresholds, such as performance thresholds 118, or configuration information. The performance analysis module 206 may be configured to determine when a handover should occur. The RAN selection module 208 may select a RAN, such as 3G RAN 104 or 5G RAN 106, to receive the handover. The preferences and thresholds 210 may include any or all of performance measurements 114, preferences 116, or performance thresholds 118. The handover module 212 may initiate a handover to the selected RAN. These operations of modules 204-212 are described in greater detail herein.

The other modules and data 214 may be utilized by the telecommunication node 200 to perform or enable performing any action taken by the telecommunication node 200. The other modules and data 214 can include a platform and applications, and data utilized by the platform and applications.

In some embodiments, the processor(s) 216 can be a central processing unit (CPU), a graphics processing unit (GPU), both CPU and GPU, or other processing unit or component known in the art.

The telecommunication node 200 can also include additional data storage devices (removable and/or non-removable) such as, for example, magnetic disks, optical disks, or tape. Such additional storage is illustrated in FIG. 2 by removable storage 218 and non-removable storage 220.

Non-transitory computer-readable media may include volatile and nonvolatile, removable and non-removable media implemented in any method or technology for storage of information, such as computer readable instructions, data structures, program modules, or other data. System memory 202, removable storage 218 and non-removable storage 220 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the telecommunication node 200. Any such computer-readable storage media can be part of the telecommunication node 200. In various examples, any or all of system memory 202, removable storage 218 and non-removable storage 220, store programming instructions which, when executed, implement some or all of the above-described operations of the telecommunication node 200.

The telecommunication node 200 may also have input device(s) 222 such as a keyboard, a mouse, a touch-sensitive display, voice input device, etc. Output device(s) 224 such as a display, speakers, a printer, etc. may also be included. The telecommunication node 200 may also include transceiver(s) 226 that allow the telecommunication node 200 to communicate with other devices, such as base stations and other devices of the telecommunication network. Such transceiver(s) 226 may include any wired or wireless communication device(s).

Figure 3:
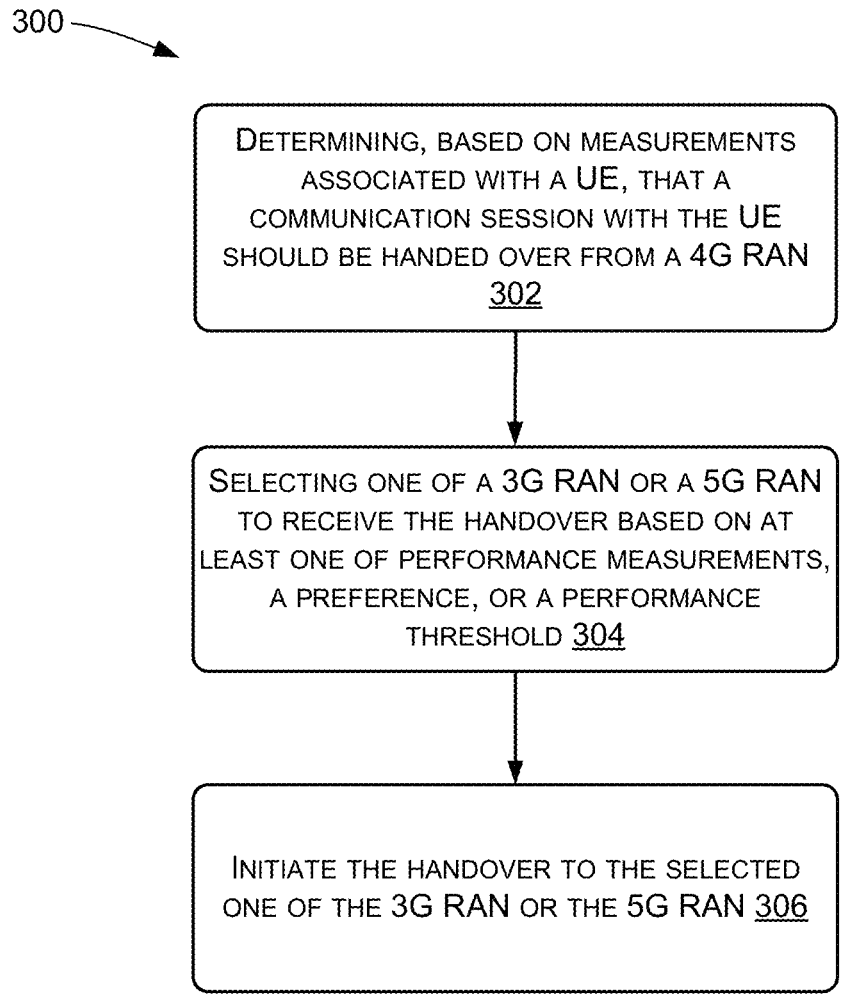
FIG. 3 is a flow diagram illustrating an example method for selecting one of a 3G RAN or a 5G RAN to receive a handover from a 4G RAN.

FIGS. 3 and 4 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 3 is a flow diagram illustrating an example method for selecting one of a 3G RAN or a 5G RAN to receive a handover from a 4G RAN. As illustrated, at 302, a telecommunication node (e.g., an MME 102) determines, based on measurements associated with UE, that a communication session with the UE should be handed over from a 4G RAN. The telecommunication node may receive the measurements in one or more measurement reports from the UE.

At 304, the telecommunication node selects one of a 3G RAN or a 5G RAN to receive the handover of the communication session based on at least one of performance measurements for the 3G RAN and the 5G RAN, a preference for the 3G RAN or the 5G RAN, or a performance threshold for the 3G RAN or for the 5G RAN. In some implementations, such as the example illustrated in FIG. 4, multiple ones of these factors may be involved in combination. In other implementations, a single factor may be used. For example, the telecommunication node may select the 3G RAN or the 5G RAN based on performance measurements of the 3G RAN and the 5G RAN. Alternatively, in another example, the telecommunication node may select the 3G RAN or the 5G RAN based on the preference for the 3G RAN or the 5G RAN.

In various implementations, the preference utilized by the telecommunication node may be selected by a user of the UE or is determined for the UE based on a UE type, a subscriber plan, a Quality-of-Service goal, a Quality-of-User-Experience goal, or a communication type associated with the communication session. Further, the performance threshold may be configurable based on a UE type, a subscriber plan, a QoS goal, a QoE goal, a communication type associated with the communication session, a load for the 3G RAN, the 4G RAN, or the 5G RAN, a load for the core network, performance measurements of a communication partner UE, or performance measurements of a communication partner network.

At 306, the telecommunication node may initiate the handover to the selected one of the 3G RAN or the 5G RAN.

FIG. 4 is a flow diagram illustrating an example method for selecting one of a 3G RAN or a 5G RAN to receive a handover from a 4G RAN based on performance of the 3G RAN and 5G RAN, based on preferences, and based on performance thresholds. More specifically, FIG. 4 illustrates in detail example sub-operations involved in operation 304, which is described further herein. As illustrated, at 402, the telecommunication node determines that one of the 3G RAN or the 5G RAN (the "First RAN" in FIG. 4) is associated with better performance measurements than the other of the 3G RAN or the 5G RAN (the "Second RAN" in FIG. 4).

At 404, the telecommunication node determines if there is a preference for the one of the 3G RAN or the 5G RAN associated with better performance measurements. If there is a preference for the one of the 3G RAN or the 5G RAN associated with better performance measurements, the telecommunication node selects, at 406, that one of the 3G RAN or the 5G RAN.

If, on, the other hand, there is a preference for the other of the 3G RAN or the 5G RAN (i.e., the RAN with the poorer performance measurements), then the telecommunication node determines, at block 408, whether performance of the other of the 3G RAN or the 5G RAN exceeds a performance threshold. At 410, if the performance exceeds the performance threshold, the telecommunication node selects the other of the 3G RAN or the 5G RAN. At 412, if the performance does not exceed the performance threshold, then the telecommunication node selects the one of the 3G RAN or the 5G RAN associated with the better performance measurements.

Although features and/or methodological acts are described above, it is to be understood that the appended claims are not necessarily limited to those features or acts. Rather, the features and acts described above are disclosed as example forms of implementing the claims.

What is claimed is:

1. A system comprising:
   a processor; and
   programming instructions configured to be executed by the processor to perform operations including:
   determining, based on measurements associated with a user equipment (UE), that a communication session with the UE should be handed over from a fourth generation (4G) radio access network (RAN);
   selecting one of a third generation (3G) RAN or a fifth generation (5G) RAN to receive the handover of the communication session based on at least one of performance measurements for the 3G RAN and the 5G RAN, a preference for the 3G RAN or the 5G RAN, or a performance threshold for the 3G RAN or for the 5G RAN; and
   initiating the handover from the 4G RAN to the selected one of the 3G RAN or the 5G RAN.

2. The system of claim 1, wherein the system is a mobility management entity associated with the 4G RAN.

3. The system of claim 1, wherein the selecting further comprises:
   determining one of the 3G RAN or the 5G RAN is associated with better performance measurements than an other of the 3G RAN or the 5G RAN;
   determining whether there is a preference for the one of the 3G RAN or the 5G RAN or for the other of the 3G RAN or the 5G RAN; and
   if there is a preference for the one of the 3G RAN or the 5G RAN, selecting the one of the 3G RAN or the 5G RAN.

4. The system of claim 3, wherein the selecting further comprises:
   if there is a preference for the other of the 3G RAN or the 5G RAN:
   determining whether the other of the 3G RAN or the 5G RAN exceeds a performance threshold; and
   if the other of the 3G RAN or the 5G RAN exceeds the performance threshold, selecting the other of the 3G RAN and the 5G RAN.

5. The system of claim 4, wherein the selecting further comprises, if the other of the 3G RAN or the 5G RAN does not exceed the performance threshold, selecting the one of the 3G RAN or the 5G RAN.

6. The system of claim 1, wherein the performance threshold is configurable based on a UE type, a subscriber plan, a Quality-of-Service goal, a Quality-of-User-Experience goal, a communication type associated with the communication session, a load for the 3G RAN, the 4G RAN, or the 5G RAN, a load for the core network, performance measurements of a communication partner UE, or performance measurements of a communication partner network.

7. The system of claim 1, wherein the preference is selected by a user of the UE or is determined for the UE based on a UE type, a subscriber plan, a Quality-of-Service goal, a Quality-of-User-Experience goal, or a communication type associated with the communication session.

8. The system of claim 1, wherein the operations further include receiving the measurements in one or more measurement reports from the UE.

9. The system of claim 1, wherein the selecting comprises selecting the 3G RAN or the 5G RAN based on performance measurements of the 3G RAN and the 5G RAN.

10. The system of claim 1, wherein the selecting comprises selecting the 3G RAN or the 5G RAN based on the preference for the 3G RAN or the 5G RAN.

11. A method comprising:
    determining, by a mobility management entity (MME), based on measurements associated with a user equipment (UE), that a communication session with the UE should be handed over from a fourth generation (4G) radio access network (RAN);
    selecting, by the MME, one of a third generation (3G) RAN or a fifth generation (5G) RAN to receive the handover of the communication session based on at least one of performance measurements for the 3G RAN and the 5G RAN, a preference for the 3G RAN or the 5G RAN, or a performance threshold for the 3G RAN or for the 5G RAN; and initiating, by the MME, the handover from the 4G RAN to the selected one of the 3G RAN or the 5G RAN.

12. The method of claim 11, wherein the selecting further comprises:
   determining one of the 3G RAN or the 5G RAN is associated with better performance measurements than an other of the 3G RAN or the 5G RAN;
   determining that the preference is for the one of the 3G RAN or the 5G RAN over the other of the 3G RAN or the 5G RAN; and
   in response to determining that the preference is for the one of the 3G RAN or the 5G RAN, selecting the one of the 3G RAN or the 5G RAN.

13. The method of claim 11, wherein the selecting further comprises:
   determining one of the 3G RAN or the 5G RAN is associated with better performance measurements than an other of the 3G RAN or the 5G RAN;
   determining that the preference is for the other of the 3G RAN or the 5G RAN over the one of the 3G RAN or the 5G RAN; and
   in response to determining that the one of the 3G RAN or the 5G RAN is associated with better performance measurements and determining that the preference is for the other of the 3G RAN or the 5G RAN:
      determining that the other of the 3G RAN or the 5G RAN exceeds the performance threshold, and
      in response to determining that other of the 3G RAN or the 5G RAN exceeds the performance threshold, selecting the other of the 3G RAN and the 5G RAN.

14. The method of claim 11, wherein the selecting further comprises:
   determining one of the 3G RAN or the 5G RAN is associated with better performance measurements than an other of the 3G RAN or the 5G RAN;
   determining that the preference is for the other of the 3G RAN or the 5G RAN over the one of the 3G RAN or the 5G RAN; and
   in response to determining that the one of the 3G RAN or the 5G RAN is associated with better performance measurements and determining that the preference is for the other of the 3G RAN or the 5G RAN:
      determining that the other of the 3G RAN or the 5G RAN does not exceed the performance threshold, and
      in response to determining that other of the 3G RAN or the 5G RAN does not exceed the performance threshold, selecting the one of the 3G RAN and the 5G RAN.

15. The method of claim 11, wherein the selecting comprises selecting the 3G RAN or the 5G RAN based on performance measurements of the 3G RAN and the 5G RAN.

16. The method of claim 11, wherein the selecting comprises selecting the 3G RAN or the 5G RAN based on the preference for the 3G RAN or the 5G RAN.

17. A non-transitory computer-readable medium having programming instructions stored thereon that, when executed by a processor, cause the processor to perform operations comprising:
   determining, based on measurements associated with a user equipment (UE), that a communication session with the UE should be handed over from a fourth generation (4G) radio access network (RAN);
   selecting, as a selected RAN, a third generation (3G) RAN or a fifth generation (5G) RAN to receive the handover of the communication session, wherein the selecting comprises:
      selecting, as the selected RAN, one of the 3G RAN or the 5G RAN based on a preference for the one of the 3G RAN or the 5G RAN if (A) the one of the 3G RAN or the 5G RAN has better performance measurements than the other of the 3G RAN or the 5G RAN or (B) the one of the 3G RAN or the 5G RAN has worse performance measurements than the other of the 3G RAN or the 5G RAN but those worse performance measurements exceed a performance threshold, or
      otherwise, selecting, as the selected RAN, the other of the 3G RAN or the 5G RAN; and
   initiating the handover from the 4G RAN to the selected RAN.

18. The non-transitory computer-readable medium of claim 17, wherein the processor is associated with a mobility management entity associated with the 4G RAN.

19. The non-transitory computer-readable medium of claim 17, wherein the performance threshold is configurable based on a UE type, a subscriber plan, a Quality-of-Service goal, a Quality-of-User-Experience goal, a communication type associated with the communication session, a load for the 3G RAN, the 4G RAN, or the 5G RAN, a load for the core network, performance measurements of a communication partner UE, or performance measurements of a communication partner network.

20. The non-transitory computer-readable medium of claim 17, wherein the preference is selected by a user of the UE or is determined for the UE based on a UE type, a subscriber plan, a Quality-of-Service goal, a Quality-of-User-Experience goal, or a communication type associated with the communication session.

* * * * *